United States Patent [19]
Luy et al.

[11] Patent Number: 5,766,281
[45] Date of Patent: Jun. 16, 1998

[54] APPARATUS FOR REMOVING DUST FROM GAS WITH LIQUID FILTER CLEANING NOZZLES

[75] Inventors: Bernhard Luy, Freiburg; Matthias Tondar, Hausen i. W., both of Germany

[73] Assignee: Glatt GmbH, Binzen, Germany

[21] Appl. No.: 773,328

[22] Filed: Dec. 23, 1996

[30] Foreign Application Priority Data

Dec. 29, 1995 [CH] Switzerland ............... 03706/95

[51] Int. Cl.$^6$ ............................................. B01D 46/04
[52] U.S. Cl. ............................................. 55/242; 95/281
[58] Field of Search ................... 95/212, 281, 278, 95/279, 280; 55/242, 302

[56] References Cited

U.S. PATENT DOCUMENTS

| | | |
|---|---|---|
| 3,053,030 | 9/1962 | Smith ............................ 55/242 |
| 3,623,910 | 11/1971 | Calhoun et al. ................. 55/242 |
| 4,300,925 | 11/1981 | Nikandrov et al. .............. 55/242 |
| 4,584,000 | 4/1986 | Guest ............................ 55/242 |
| 4,680,038 | 7/1987 | Titus ............................ 55/302 |
| 4,731,100 | 3/1988 | Loeffelmann et al. ............ 55/302 |
| 4,973,458 | 11/1990 | Newby et al. ................... 55/302 |
| 5,242,472 | 9/1993 | Sellakumar ..................... 55/302 |
| 5,423,977 | 6/1995 | Aoki et al. ..................... 210/107 |
| 5,444,892 | 8/1995 | Ris et al. ...................... 15/304 |
| 5,531,798 | 7/1996 | Engstrom et al. ................ 55/302 |

FOREIGN PATENT DOCUMENTS

| | | | |
|---|---|---|---|
| 2521828 | 11/1976 | Germany ............... 55/242 |
| 3022203 | 12/1981 | Germany ............... 55/242 |
| 3325807 | 1/1985 | Germany ............... 55/242 |
| 94 00 913.9 | 4/1994 | Germany . | |

OTHER PUBLICATIONS

Chemie Technik, Bd. 23, Nr. 10, Oct. 1994, Heidelberg, DE.

Primary Examiner—Duane S. Smith
Attorney, Agent, or Firm—Jacobson, Price, Holman & Stern, PLLC

[57] ABSTRACT

The apparatus has at least one container. This has an inner wall part which separates a crude gas space from a clean gas space and holds filters projecting into the crude gas space as well as wet cleaning devices which have a displaceable spray member with a rotatable spray head having liquid outlet holes. During normal operation of the apparatus, process gas is passed through the container and the filters, the filters removing dust from the process gas and each spray member being present in a rest position and being flush with a surface of the wall part, which surface is adjacent to the crude gas space. The spray members are displaced into the crude gas space for wet-cleaning of the filters and then sprayed with cleaning liquid against the filters, the wet cleaning devices not connecting the crude gas space to the clean gas space in any position of the spray members.

10 Claims, 4 Drawing Sheets

Fig. 1

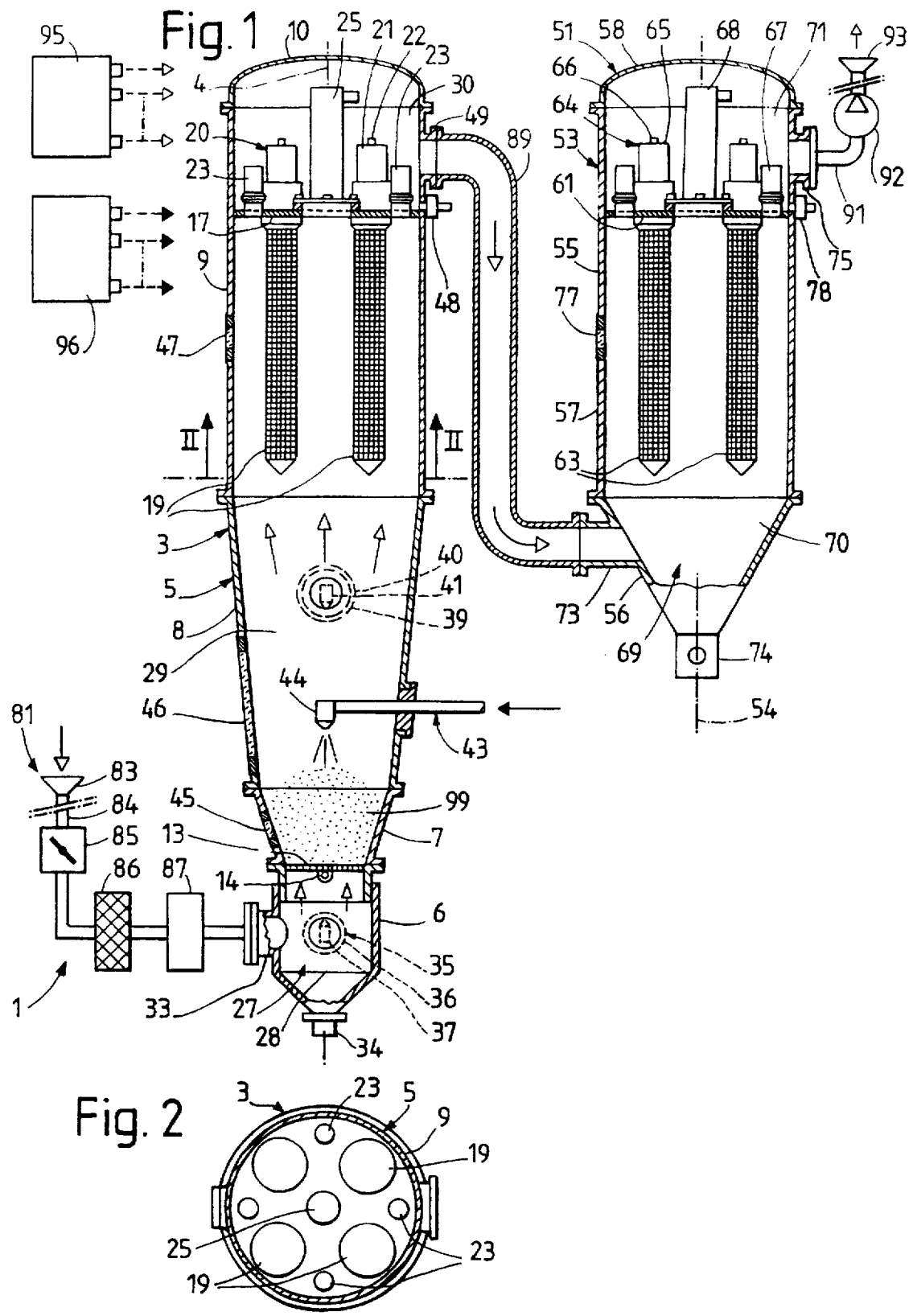

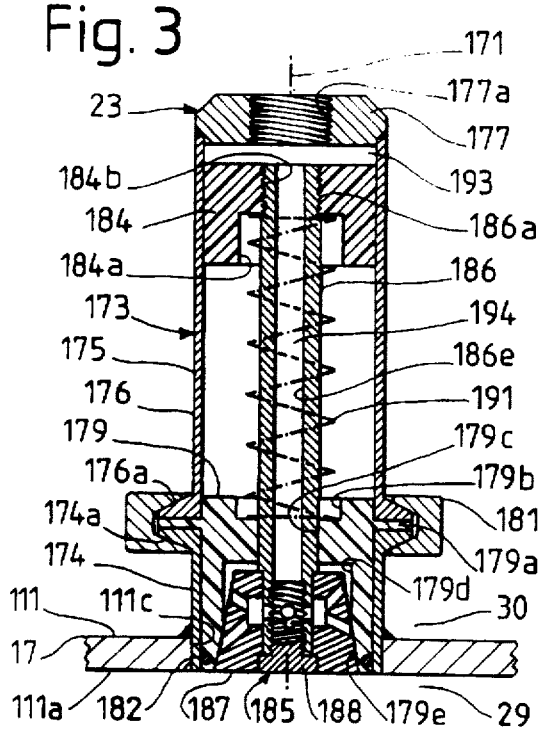
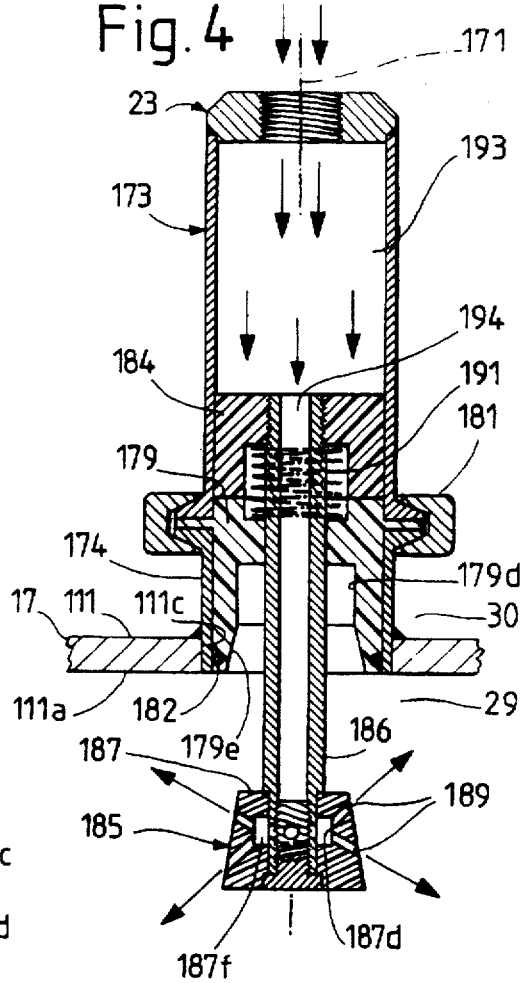
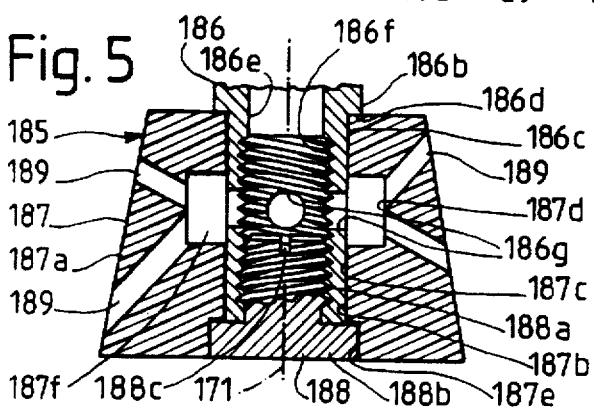
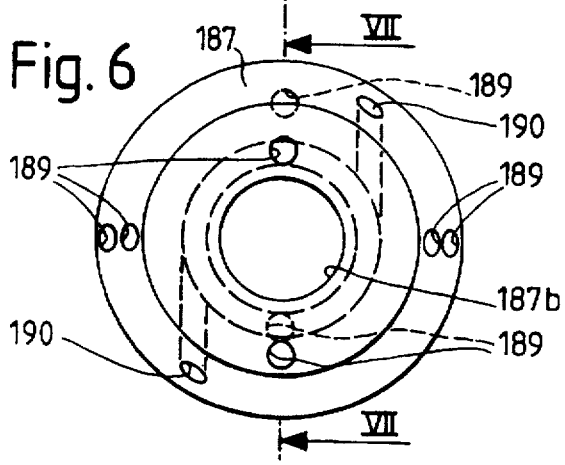
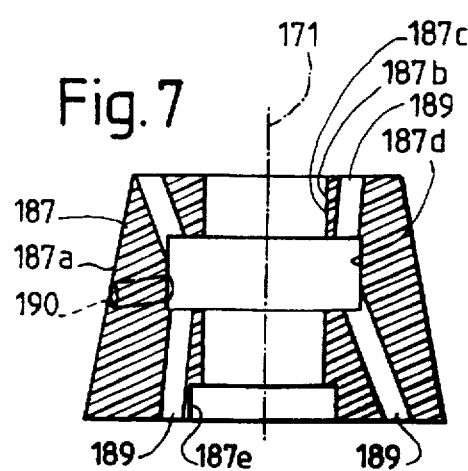

APPARATUS FOR REMOVING DUST FROM GAS WITH LIQUID FILTER CLEANING NOZZLES

BACKGROUND OF THE INVENTION

1. Field of the Invention

The invention relates to an apparatus for removing dust from gas, in particular from gas passed through a particulate material.

The terms "crude gas space" and "clean gas space" used below are first explained here. The crude gas space is understood as meaning a space which is adjacent to at least one filter and contains the gas to be filtered and to be freed from dust and from which the latter flows into the filter. A clean gas space is then understood as meaning a space which is adjacent to the or at least one filter and which the gas enters after flowing through the filter or the filters.

The apparatus has at least one container enclosing a crude gas space and at least one filter projecting into the crude gas space. The apparatus may have, for example, a material container and may be formed for passing gas and a particulate material present therein through the crude gas space and for moving and treating the material, it being possible, for example, for the material to be fluidized with the gas and/or to be moved by a rotor which bounds the crude gas space at the bottom and has a disk. The means may serve, for example, for moving and treating a particulate material which is intended for the formation of a drug containing at least one pharmaceutical active ingredient, i.e. at least one active ingredient having a biological effect. The or at least one active ingredient may be contained, for example, in the particulate material introduced in the solid, dry or moist state into the material container. However, it is also possible to spray the particulate material in the material container with a liquid which may contain a dissolved or dispersed active ingredient. In addition to the material container or instead of it, the apparatus may have a downstream dust remover and/or another filtration device with a container which, when used, does not itself contain a particulate material but to which gas to be freed from dust is fed from another material container containing a particulate material. The apparatus may furthermore be formed as a spray dryer.

2. Description of the Prior Art

A fluidized-bed apparatus disclosed in European Patent Application 0 572 356 has a container which encloses a crude gas space serving for the fluidization of a particulate material and at least one vertical cartridge filter which projects into said space and has a fabric filtration member, i.e. comprising a textile fabric. The container has a ceiling which is provided with a hole for each filter. Each of these holes is covered by a cylindrical cap which is fastened to the ceiling on the upper side thereof and bounds a clean gas space connected to a gas discharge line. Each cap contains a wet-cleaning device or wash device having an annular spray member which is arranged close to the ceiling and has inward-directed liquid outlet holes.

During normal operation of the known fluidized-bed apparatus, the filters are in a filtration position in which the upper end of the filter closes that hole in the ceiling which is coordinated with said filter. The process gas which serves for fluidizing a particulate material then flows through the filter into the clean gas spaces. If the filters are to be cleaned, i.e. washed, with a liquid, they are pushed upward into the caps through the holes present in the ceiling of the container by means of an adjusting device after the end of the normal operation of the apparatus and are sprayed with a cleaning liquid during the displacement in the case of the annular spray members.

In the apparatus disclosed in European Patent Application A 0 572 356, the outer filter surfaces adjacent to the crude gas space of the container during normal operation enter the clean gas spaces bounded by the caps during a wet cleaning procedure. Furthermore, in the case of wet cleaning the holes in the container ceiling, which are closed by the upper ends of the filters during normal operation, provide a connection between the crude gas space and the clean gas spaces in the caps. There is therefore a considerable danger that the clean gas spaces of the caps and the filter interiors will be contaminated with the material from the crude gas space. During subsequent operation of the apparatus, this material may then be transported out of the caps by the process gas and may contaminate the environment of the apparatus. This is very disadvantageous when processing toxic substances and/or active ingredients for drugs. Conversely, during wet cleaning, material which, for example, has entered the clean gas spaces of the caps during a preceding wet cleaning procedure may be washed into the crude gas space by the cleaning liquid and may contaminate the space. Such contamination processes may impair the purity and quality of the treated material. This can be very disadvantageous in the successive treatment of different materials for the formation of drugs which have to meet extremely high purity requirements. In addition, the cartridge filters are often rather large and heavy so that furthermore large and expensive guide members and adjusting devices are required for displaceable guidance and displacement of filters. Furthermore, caps present on the ceiling of the container and the adjusting devices occupy a great deal of space.

SUMMARY OF THE INVENTION

It is the object of the invention to provide an apparatus for removing dust from gas, by means of which disadvantages of the known apparatuses can be avoided and in which in particular the or each filter can be thoroughly cleaned with a liquid without the crude gas space being connected to a clean gas space adjacent to the filter by a connection bridging said filter.

This object is achieved, according to the invention, by an apparatus for removing dust from gas, in particular from gas passed through a particulate material serving, for example, for the formation of a drug, having at least one container enclosing a crude gas space, a wall part adjacent to the crude gas space holding at least one filter projecting into the crude gas space and at least one spray member in order to spray a liquid against an outer surface of the or at least one filter, wherein the wall part has, for the or each spray member held by it, a hole having a mouth opening into the crude gas space and wherein the spray member is displaceable from a rest position, in which it is present essentially on that side of the mouth of the hole which faces away from the crude gas space, into the crude gas space.

The embodiment, according to the invention, of the apparatus makes it possible for the or each filter to be subjected to wet cleaning or to be washed in a manner which will be described in more detail, so that, during spraying and washing of a filter, no connection which bridges or bypasses the filter is formed between the crude gas space and a clean gas space connected to the filter. This makes it possible to prevent dust and other solid substances from passing from the crude gas space into the clean gas space and from there into the environment of the apparatus and/or subsequently back into the crude gas space. This is of considerable advantage particularly when processing toxic substances and/or active ingredients.

The or each spray member preferably has an end surface which, in the rest position, is at least approximately and, for example, exactly flush with that surface of the wall part holding the spray member which is adjacent to the crude gas space. Furthermore, the or each spray member closes dust-tight the hole present for said spray member. During normal operation of the apparatus, said wall part and the or each spray member held by it accordingly do not form any recesses and/or grooves or other dead spaces in which dust particles or other materials can be retained.

The or each spray member is preferably substantially smaller and lighter than a filter and, preferably in its cleaning position, preferably projects into the crude gas space to a substantially smaller extent than the filter or the filters. The or each spray member and the guide and adjusting and/or displacement members serving for guidance and displacement of a spray member may then be formed substantially smaller and lighter than the guide and displacement members which would be required for guiding and displacing a filter.

BRIEF DESCRIPTION OF THE DRAWINGS

The subject of the invention is now described in detail with reference to embodiments shown in the drawings. In the drawings, FIG. 1 shows a simplified vertical section through a material container and a downstream dust remover container of a fluidized-bed apparatus for treating a particulate material, FIG. 2 shows a simplified horizontal section through the material container, along the line II—II of FIG. 1, FIG. 3 shows, on a larger scale than in FIG. 1, an axial section through a first wet cleaning device arranged in the material container and having a spray member present in the rest position, FIG. 4 shows an axial section through a first wet cleaning device whose spray member has been displaced into the cleaning position, FIG. 5 shows an axial section through a part of the spray member on a larger scale than in FIGS. 3 and 4, FIG. 6 shows a plan view of that end of the spray head of the spray member which is at the top in FIGS. 3 to 5, FIG. 7 shows an axial section through the spray member, along the line VII—VII of FIG. 6.

DESCRIPTION OF THE PREFERRED EMBODIMENTS

Figure 8:
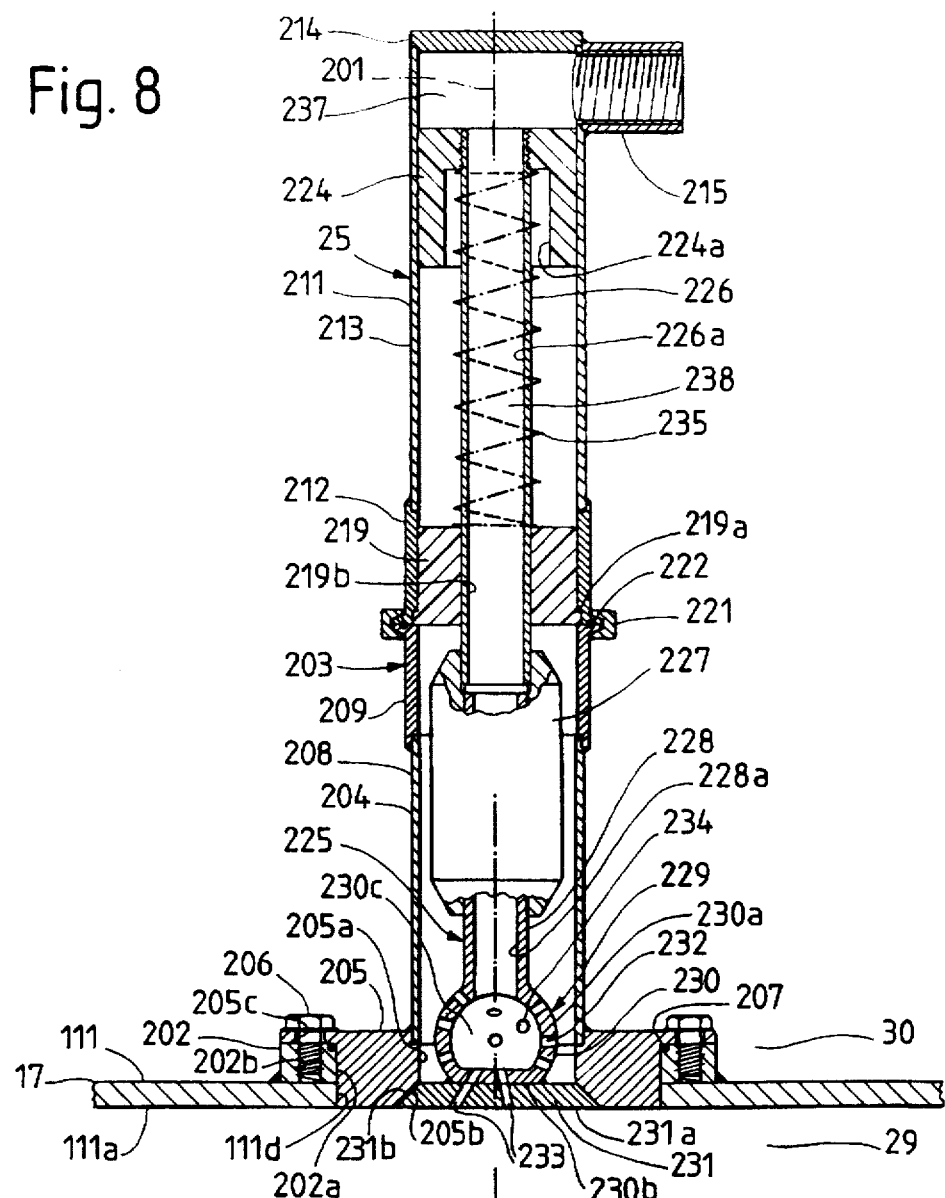
FIG. 8 shows, on a larger scale than FIGS. 1 and 2, an axial section throughout another, second wet cleaning device arranged in the material container, the spray member being in the rest position.

The fluidized-bed apparatus 1 shown in FIG. 1 has a material and fluidized bed container 3 which is generally rotationally symmetrical with respect to a vertical container axis 4. The container 3 has a wall 5. This is held on a frame, which is not shown, and has a plurality of detachable wall parts tightly connected to one another, for example, from bottom to top, a bottom wall part 6, a lower conical wall part 7, an upper conical wall part 8, a cylindrical wall part 9 and a top wall part 10. A perforated bottom 13 is arranged at the upper end of bottom wall part 6 in the container and is mounted on bearing and pivot members 14 so that it is pivotable about a horizontal axis of rotation and capable of being fixed in different pivotal positions. The material container 3 furthermore has an inner container part or inner wall part 17 which is arranged in the upper half of the cylindrical wall part 9, is firmly and tightly connected thereto and serves as a partition.

The inner wall part 17 holds at least one filter 19 and namely a plurality of filters 19, for example four filters 19 being distributed around the container axis 4 as in the material and fluidized bed container 3 according to FIG. 2 and being a distance apart from one another. Each filter 19 is detachably fastened to the inner wall part 17 and projects away from this in a downward direction. A gas cleaning device 20 shown only schematically in FIG. 1 and having a closure device 21 and a cleaning gas inlet 22 is fastened to wall part 17, for each filter 19. The inner wall part 17 furthermore holds wet cleaning members for wet-cleaning of the filters 19. The wet cleaning members have at least one wet cleaning device or wash device and namely four first wet cleaning devices 23 and a second, larger wet cleaning device 25. The axes of the four first wet cleaning devices 23 are further away from the container axis 4 than the filter axes, together form a ring and, in the projection shown in FIG. 2 and parallel to the container axis and to the filter axes, are distributed around the container axis 4 in such a way that each first wet cleaning device is present approximately between two filters 19 adjacent to one another. The second wet cleaning device 25 is present in the center of the inner wall part 17.

The wall parts 6, 7, 8, 9, 10 together form the outer wall of the wall 5 and tightly seal a container interior 27 from the environment. The perforated base 13, the inner wall part 17 serving as a partition and the filters 19 fastened thereto and devices 21, 23, 26 divide the interior 27 into three parts, namely, from bottom to top, into a gas distribution space 28, a fluidizing and crude gas space 29 and a clean gas space 30.

The bottom wall part 6 is provided with a gas inlet 33 and a gas outlet 34. The latter has a passage and an adjustable closure member for alternatively closing or opening the passage. At least one wet cleaning device or wash device 35 has a holder which is fastened on the outside of the bottom wall part 6, below the perforated bottom 13, and has a housing 36 and at least one spray member 37 with at least one spray nozzle or outlet orifice. At least one wet cleaning device or wash device 39 arranged above the perforated bottom has at least one holder which is fastened on the outside of the conical wall part 8 and has a housing 40 and at least one spray member 41 with at least one spray nozzle or outlet orifice.

A spray device 43 which has at least one spray member 44 arranged in the fluidizing and crude gas space 29 and having at least one spray nozzle for spraying a spray material containing a binder or coating material or the like may also be present. The spray member 44 is fastened, for example by means of a holder between the perforated bottom 13 and the wet cleaning device 39, on the conical wall part 8 and is connected to a liquid line passing through said wall part. The wall 5 is provided with a window, for example at least one window 45 or 46 or 47 being arranged in each of the wall parts 7, 8 and 9, respectively. The cylindrical wall part 9 is provided with a liquid outlet 48, which can be opened or closed, at a circumferential point of the upper surface of the inner wall part 17 and with a gas outlet 49 above the inner wall part 17.

The apparatus 1 has a downstream dust remover 51 with a downstream dust remover container 53. Its wall 55 is in general rotationally symmetrical with respect to a vertical container axis 54 and has a plurality of wall parts detachably connected to one another, namely an essentially conical bottom wall part 56 tapering downward, a cylindrical wall part 57 and a top wall part 58. An inner container part or inner wall part 61 which forms a partition is fastened in the downstream dust remover container 53. Filters 63 are detachably fastened to the inner wall part 61, a gas cleaning device 64 with a closure device 65 and a cleaning gas inlet 66 being coordinated with each of said filters. Furthermore, first wet cleaning devices or wash devices 67 and a second wet cleaning device or wash device 68 are detachably fastened to the inner wall part 61. The filters 63 and the wet cleaning devices 67, 68 are, for example, distributed over the inner wall part 61 identically or similarly to the filters 19 and wet cleaning devices 23, 25 over the inner wall part 17.

The wall parts 56, 57, 58 together form the outer wall of the wall 55 and tightly seal an interior 69 from the environment. The inner wall part 61 serving as a partition and the filters 63 fastened thereto and devices 64, 67, 68 divide the interior 69 into a crude gas space 70 and a clean gas space 71, the crude gas space 70 being located below the inner wall part 61, and the clean gas space 71 above said wall part. The container 53 has a gas inlet 73 opening into the crude gas space 70, an alternatively closable and openable outlet 74 arranged at the lower end of the bottom part 56, a gas outlet 75 leading out of the clean gas space 71, at least one window 77 and an alternatively openable and closable liquid outlet 78 arranged at a circumferential point of the upper surface of the inner wall part 61.

The walls 5 and 55 of the two containers 3 and 53, respectively, consist essentially—i.e. apart from seals present between the various wall parts, and the windows and the like—of metallic materials, namely of stainless steel. Each window has at least one glass pane.

The fluidized-bed apparatus 1 also has gas conduction members 81 for passing a process gas, namely air, from bottom to top through the two containers 3, 53. The gas conduction members 81 have an air inlet 83 open to the environment of the containers 3, 53. Said air inlet is connected to the gas inlet 33 of the material container 3 via a gas line 84, a shut-off and/or control device 85, a dust filter 86 and a gas processing device 87. The gas processing device 87 has, for example, a heating and/or cooling device and/or a dehumidifying device. The gas outlet 49 of the fluidized-bed container 3 is connected via a gas line 89 to the gas inlet 73 of the downstream dust remover container 53. The gas outlet 75 of the latter is connected via a gas line 91 and a suction device 92 to an air outlet 93 opening into the environment.

The apparatus 1 has cleaning gas feed members 95 which are shown only schematically and possess at least one compressed gas source which has, for example, a filter, a compressor and a compressed air container. The cleaning gas feed members 95 furthermore have shut-off devices connected to the or each compressed gas source, for example electric or pneumatic valves which are arranged close to the container 3 and whose outlets are connected to the cleaning gas inlets 22 and 64 by gas lines which are merely indicated by dashed arrows.

The apparatus furthermore has cleaning liquid feed members 96 which are shown only schematically. These have, for example, at least one pump, at least one liquid reservoir and shut-off devices, for example electric or pneumatic valves. These are connected by liquid lines, which are indicated by dashed arrows, to the wet cleaning devices 23, 25, 35, 39, 67 and 68 arranged in the two containers 3 and 53.

Each filter 19, 63 is fastened, essentially rotationally symmetrically with respect to a filter axis and nondisplaceably, on the inner wall part 17 or 61, respectively. Each filter 19, 63 is in the form of an essentially dimensionally stable cartridge filter and has in particular a likewise essentially dimensionally stable, gas-permeable, essentially cylindrical, metallic casing coaxial with the filter axis. Said casing encloses a largely empty filter interior and has at least two and, for example, three wire fabrics sintered together and having different mesh sizes. The wire fabric which is outermost and hence forms the outer surface of the casing has the smallest mesh size and serves as a filtration member for precipitating dust from a gas to be filtered onto the outer surface of the casing. The casing is fold-free so that its outer surface is essentially smooth.

The inner wall part 17 has plate 111 shown in FIGS. 3, 4, 8 and 9. Said plate has, at the bottom, a surface 111a adjacent to the crude gas space 29 and is provided with a hole 111c shown in FIGS. 3 and 4 for each first wet cleaning device 23 and with a hole 111d shown in FIGS. 8 and 9 for the second wet cleaning device 25. The holes 111c, 111d consist of through-bores and have a mouth opening into the crude gas space 29 from the surface 111a.

One of the first wet cleaning devices or wash devices 23 is shown separately in FIGS. 3 and 4. Each first wet cleaning device 23 is essentially rotationally symmetrical with respect to an axis 171, which is also the axis of the hole 111c coordinated with the relevant cleaning device 23. Each cleaning device 23 has a housing 173. This is fastened to the wall part 17 and, on the side facing away from the crude gas space 29, projects away from this and tightly seals the hole 111c from the free region of the clean gas space 30. The housing 173 has an annular, metallic, lower housing part 174 which fits in one of the holes 111c of the plate 111 of the wall part 17, is flush at the bottom with the surface 111a of the plate 111, projects out of the latter at the top and is tightly fastened, for example welded, to the plate 111. The housing part 174 is for the most part a hollow cylinder and has an outward-projecting collar 174a at its upper end. The housing 173 also has an upper housing part 175. This has a sleeve 176 with a cylindrical casing and a collar 176a projecting outward at the lower end of said casing. The metallic sleeve 176 is closed at the upper end by a metallic end member 177 tightly connected, for example welded, to said sleeve. Said end member has a continuous threaded bore which serves as liquid inlet 177a and is detachably connected to a line of the cleaning liquid feed members 96, which is not shown in FIGS. 3 and 4.

An integral guide member 179 consisting of dimensionally stable plastic is arranged in the housing 173 and extends from the lower end of the lower housing part 174 into the lower end section of the upper housing part 175. The guide member 179 has a cylindrical outer surface fitting tightly into the cylindrical inner surfaces of the lower part 174 and of the sleeve 176 and a band 179a projecting outward, away from said outer surface, between the two collars 174, 176a. The guide member 179 is provided with a through-hole 179b coaxial with the axis 171. Said hole has a cylindrical hole section 179c and, below this, an extension 179d with a cylindrical hole section and a conical hole section 179e widening downward away from said cylindrical hole section. The guide member 179 has, at its lower end, an annular, radial, flat end surface which is at least approximately and preferably exactly flush with the end surface present at the lower end of the lower housing part 174 and with the surface 111a of the plate 111. A connecting member 181 consisting of a multi-part clamp or clip encloses the two collars 174a, 176a and connects the two housing parts 174, 175 detachably with one another in such a way that the band 179a is firmly clamped between the two collars and seals off the two housing parts 174, 175 from one another. A seal 182 is arranged in an annular groove in the outer surface of the guide member 179 and seals off the latter in the vicinity of its lower end from the lower housing part 174.

A cylindrical piston 184 consisting of plastic is displaceable in the sleeve 176. The piston 184 has a through-hole 184a coaxial with the axis 171. Said hole has a section with an internal thread 184b.

A multi-part spray member 185, partly also shown in FIG. 5, has a metallic rod 186 coaxial with the axis 171. Said rod has, at its upper end, an external thread 186a screwed to the internal thread 185b. The rod 186 furthermore has a cylindrical section 186b which is displaceably guided in the hole section 179c of the guide member 179 with little radial play. The short, cylindrical end section 186c of the rod 186 has a diameter which is slightly smaller than the diameter of the section 186b, said end section facing away from the piston 185, projecting from the cylindrical hole section 179c of the guide member 179 and being particularly clearly shown in FIG. 5. A radial locating surface 186d is present between the two cylindrical sections 186b, 186c. The rod 186 is hollow and has a through-hole 186e which is coaxial with the axis 171 and is provided with an internal thread 186f at its end facing away from the piston 185. Furthermore, the end section 186c of the rod 186 is provided with at least one radial hole 186g opening into the axial hole 186e, and namely with a plurality of holes 186g distributed around the axis 171.

The spray member 185 furthermore has a spray head 187 which consists of plastic, is also shown separately in FIGS. 6 and 7 and has an outer surface 187a. This has a conical lateral surface widening in the downward direction. Said lateral surface makes the same angle with the axis 171 as the conical section 179e of the hole 179c of the guide member 179 and has, at its lower end, at least approximately the same diameter as the conical hole section 179e. The spray head is bounded by a flat, radial end surface at each of its lower and upper ends. The spray head 187 has a through-hole 187b coaxial with the axis 171. Said hole has a cylindrical section 187c, which is divided into two parts by an extension 187d, and an extension 187e at the lower end.

The spray head 187 fits on the end section 186c of the rod 186 with little radial play and rotatably about the axis 171 and is detachably connected to the rod 186 by means of a fastening member 188. The fastening member 188 consists of a screw and has a thread part 188a screwed to the internal thread 186f of the spray head 186 and a head 188b fitting in the extension 187e of the hole 187b of the spray head 187. The thread part 188a has a slot 188c at its end facing away from the head 188b, so that the fastening member 188 can be screwed tight in the rod 186 by means of a screwdriver inserted from the upper end of the rod 186 in its hole 186e. On its side associated with the thread part 188a, the head 188b rests with a flat, radial annular surface on the end surface of the rod 186 and holds the spray head 187 together with the locating surface 186d on the rod with at most little axial play. The head 188b has, on its side facing away from the thread 188a, a completely flat end surface which has neither a slot nor a hole or the like and is flush with the lower end surface of the spray head 187. That free region of the extension 187d which encloses the rod 186 forms an annular cavity 187f of the spray head 187. The spray head 187 has at least one liquid outlet hole extending from the cavity 187f into the outer surface 187a and preferably a plurality of liquid outlet holes denoted by 189 and 190. These are straight and run in different directions away from the free region of the extension 187d toward the outer surface 187a. The axes of the outlet holes 189 intersect the axis 171 and make various angles with it. The outlet holes 189 are furthermore staggered relative to one another in groups around the axis 171. For example, two outlet holes 189 opening into the upper end surface, four outlet holes 189 opening into the conical lateral surface and two outlet holes 189 opening into the lower end surface are present. The outlet holes furthermore have at least one outlet hole 190 skew to the axis 171, for example two such outlet holes 190 being present and having outlet mouths located in the conical lateral surface and staggered 180° relative to one another around the axis 171. Each outlet hole 190 thus has an axis not intersecting the axis 171 and makes with the axis 171—in a projection onto a plane parallel to the axis 171 and to its own axis—preferably an angle of at least 70° to at most 110°. One outlet hole 190 is, for example, inclined 5° to 10° upward away from the extension 187d relative to a plane at right angles to the axis 171, while the other hole 190 is inclined 5° to 10° downward away from the extension 187d.

A spring 191 is arranged between the guide member 179 and the piston 184 and encloses the rod 186, and the ends of said spring project into facing extensions of the holes 179b and 184a of the guide member 179 and piston 184, respectively. The spring 191 exerts a force directed upward away from the crude gas space 29 on the piston 184 and on the spray member 185 connected to this and attempts to force said spray member into its rest position shown in FIG. 9. In the rest position of the spray member 185, the spray head 187 of said spray member rests with its conical lateral surface on the conical hole section 179e of the guide member 179. The lower end of the spray head 187 is at least approximately and preferably exactly flush with the lower ends of the guide member 179 and of the housing 171 and with the lower surface 111a of the plate 111.

The piston 184 rests in at least an approximately liquid-tight manner against the inner surface of the sleeve 176 and is connected to the rod 186 in an at least approximately liquid-tight manner. Furthermore, the hole section 179c of the guide member 179 forms an at least approximately and, for example, completely liquid-tight passage for the rod 186. The fastening member 188 seals the hole 186e of the rod 186 at least to some extent at the lower end of said rod, said hole being coaxial with the axis 171. Furthermore, in the rest position of the spray head 187, the conical lateral surface of said spray head rests at least approximately tightly against a conical section 179e of the hole 179b of the guide member 179.

The liquid inlet 177a opens into a cavity 193 present in the housing 173 between the end member 177 and the piston 184. The hole 186e coaxial with the axis 171 and the radial holes 186e of the rod 186 together form a passage 194 which connects the cavity 193 through the piston 184 to the annular cavity 187f and via this to the liquid outlet holes 189, 190.

Figure 9:
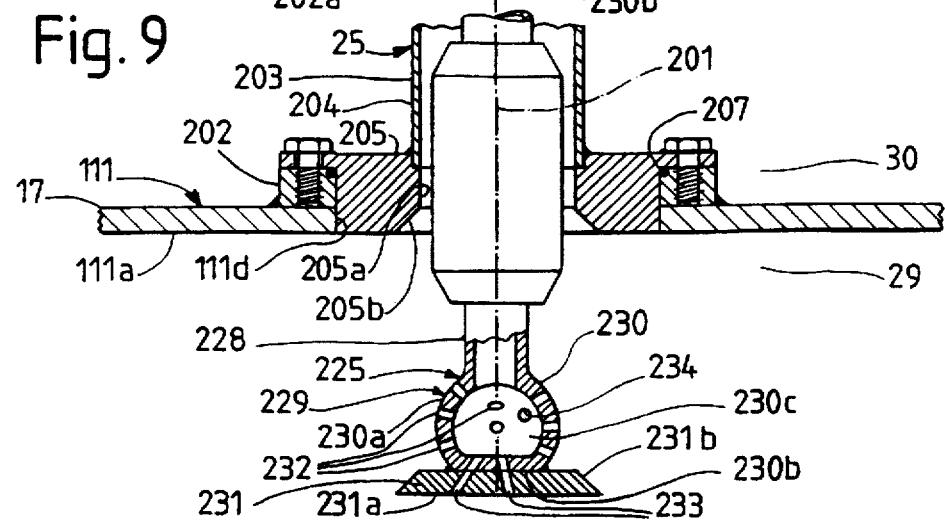
FIG. 9 shows an axial section through the lower part of the second wet cleaning device, but with the spray member extended into the cleaning position.

The second wet cleaning device or wash device 25 is visible separately in FIG. 8 and partly in FIG. 9. The second wet cleaning device 25 is essentially rotationally symmetrical with respect to an axis 201, which is also the axis of that hole 111d of the plate 111 of the wall part 17 which is coordinated with the relevant device 25. The wall part 17 has, at each hole 111d of the plate 111, a reinforcing ring 202 which is firmly attached, namely welded, to the upper side of the plate 111. Said reinforcing ring has a cylindrical hole 202a flush with the hole 111d and some threaded bores 202b distributed along its circumference.

The second wet cleaning device 25 has a housing 203 which is detachably and tightly fastened to the wall part 17 and projects away on that side thereof which faces away from the crude gas space 29. The housing 203 has a lower housing part 204. This has, at its lower end, an annular flange 205 which projects through the hole 202a of the reinforcing ring 202 into the hole 111d of the plate 111 and has, at the bottom, a flat end face which is at least approximately and preferably exactly flush with the surface 111a of the plate 111. The annular flange 205 has a hole 205a which is coaxial with the axis 201 and has a cylindrical section at the top and a conical hole section 205b extending away therefrom and opening into the lower end surface. The annular flange 205 furthermore has bores 205c distributed along its circumference and is detachably fastened to the reinforcing ring 202 by means of screws 206 and is sealed against the ring by means of a seal 207. The lower housing part 204 also has two generally cylindrical sleeves 208 and 209, of which the lower sleeve 208 is firmly and tightly connected, for example welded, to the annular flange 205 and to the upper sleeve 209.

The housing 203 has an upper housing part 211 having two sleeves 212, 213 flush with one another, of which the upper sleeve 213 is closed at the upper end by an end member 214. The upper sleeve 213 is provided, close to its upper end, with a liquid inlet 215 which is formed by a nozzle projecting away radially from the upper sleeve and having an internal thread and is connected to a line of the cleaning liquid feed members 96, which line is not shown in FIG. 8. The two sleeves 212, 213, the end member 214 and the inlet 215 are firmly and tightly connected, namely welded, to one another.

A plastic guide member 219 has a generally cylindrical outer surface, fits in the hole, coaxial with the axis 201, in the lower sleeve 212 of the upper housing part 211 and has, at the lower end, a band 219a which projects into an extension of the stated hole in the sleeve 212. The guide member 219 furthermore has a continuous, cylindrical hole 219b coaxial with the axis 201. The sleeves 209 and 212 have, at their ends facing one another, outward-projecting collars adjacent to one another. A connecting member 221 enclosing these connects the sleeve 209 and 212 and hence the two housing parts 204, 211 detachably to one another, with the result that the band 219a of the guide member is also firmly clamped between the two sleeves 209, 212. A seal 222 seals the two sleeves 209, 212 against one another. A cylindrical piston 224 consisting of plastic is displaceably guided in the upper housing part 211 and has a through-hole 224a which is coaxial with the axis 201 and has a section with an internal thread and, below this, an extension.

The second wet cleaning device 25 has a spray member 225 with an essentially cylindrical, hollow rod 226 coaxial with the axis 201. Said rod is provided, at the upper end, with an external thread, screwed into the internal thread of the hole 204a of the piston 204 and thus connected to this in a detachable and liquid-tight manner. The rod 226 passes through the hole 219b of the guide member 219, is displaceably guided therein and has an axial through-hole 226a. A connecting and bearing member 227 is fastened to the lower end of the rod 219. A rod 228 which projects from the bottom of the connecting and bearing member 227 and has an axial through-hole 228a is mounted in said connecting and bearing element so as to be rotatable about the axis 201. The spray head 229 of the spray member 225 has a hollow member 230 firmly and tightly connected to the lower end of the rod 228. The outer surface 230a of said hollow member is for the most part approximately spherical but has, on the side facing away from the piston 224, a flat, horizontal surface section 230b perpendicular to the axis 201. The hollow member 230 encloses a cavity 230c. The spray head 229 furthermore has a small flat plate 231 which is coaxial with the axis 201 and essentially rotationally symmetrical and rests with the flat surface against the flat surface section 230b of the hollow member 230. The small plate 231 has a flat surface 231a, which faces away from the hollow member and forms the end surface of the entire spray member 225, and a conical edge surface 231b. This makes with the axis 201 the same angle as the conical hole section 205b. The spray head 229 has some straight liquid outlet holes 232, 233 and 234. The axes of the outlet holes 232 and 233 intersect the axis 201 and make different angles with it. The outlet holes 232 run from the cavity 230c to the spherical section of the outer surface 230a. The two outlet holes 232 extend from the cavity 230c to the flat surface section 230b and through the small plate 231 to its surface 231a. The or each outlet hole 234 is skew to the axis 201, preferably at least two skew outlet holes 234 staggered relative to one another around the axis 201 being present.

A spring 235 arranged between the guide member 219 and the piston 224 exerts a force, directed upward away from the crude gas space 29, on the piston 242 and the spray member 225 connected thereto and attempts to keep the latter in the rest position shown in FIG. 8. The inlet 215 opens into a cavity 237 present in the housing 203 between the end member 214 and the piston 224. Said cavity is connected, by a passage 238 running through the piston 224, through the rods 226, 228 and through the connecting and bearing member 227, to the cavity 230c and via this to the outlet holes 232, 233, 234 of the spray head 229.

The housing 203 projecting into the hole 111d of the plate 111 covers this hole 111d and seals it from the free region of the clean gas space 30. When the spray member 225 is in the rest position shown in FIG. 8, the small plate 231 of the spray head 239 seals the conical hole section 205b of the hole 205a of the annular flange 205 and hence the interior of the housing 203 more or less tightly from the crude gas space 29. However, the cavity 230c of the spray head 229 still remains connected to the crude gas space 29 by the liquid outlet holes 233. That surface 231a of the small plate 231 which forms the end surface of the spray head 229 and of the entire spray member 225 is at least approximately and preferably exactly flush with the lower end surface of the annular flange 205 of the housing 202 and with that surface 111a of the plate 111 which is adjacent to the crude gas space 29, when the spray member 225 is in the rest position.

The second wet cleaning device 25 has larger external dimensions that the first wet cleaning devices 23. The diameter of the hollow member 230 of the second wet cleaning device 25 is, for example, at least or about 50% larger than the diameter of the spray head 187 of the first wet cleaning devices. When the cleaning liquid feed members 96 feed a cleaning liquid which is at the same pressure to the wet cleaning devices 23, 25 during the cleaning described in detail, the spray rate of the second wet cleaning device 25 is substantially greater—for example about two to five times greater—than the spray rate of a first wet cleaning device 23.

The housings 36, 40 of the wet cleaning devices 35 and 39, respectively, are arranged essentially outside the wall 5 and contain a housing interior sealed tightly from the environment. The spray members 37 and 41 are approximately horizontally displaceable in the housings 36 and 40, respectively, and can alternatively be brought into a rest position or into a cleaning position. In the rest position, they are essentially outside the container interior 27 in the housings 36 and 40. The interiors of the latter are then sealed from the container interior 27, for example by the spray members 37 and 41 and/or by additional closure members, approximately flush with the inner surface of the wall 5. In the cleaning position, each spray member 37 and 41 is present at least partly in the gas distribution space 28 or in the fluidizing and crude gas space 29.

The housings 36, 40 have a liquid inlet for cleaning liquid. Each wet cleaning device 35, 39 is, for example, furthermore provided with a spring, similarly to the wet cleaning devices 23, 25, and is formed in such a way that, starting from its rest position, the spray member 37 or 41 is moved to the cleaning position on feeding of a cleaning liquid under pressure, against the restoring force generated by the spring. The spray member 35 or 47 then remains in the cleaning position until the cleaning liquid feed is ended and the spray member is pushed back into the rest position by the spring.

The spray nozzles or outlet orifices of the spray members 37 and 41 are located, for example, approximately in the container axis 4 when said spray members are in the cleaning position. The spray members 37, 41 can spray the cleaning liquid fed to them, for example into a space which extends over a rather large three-dimensional angle. The or a spray nozzle or outlet orifice of the lower spray member 37 is directed upwards. The or at least one spray nozzle or outlet orifice of the upper spray member 41 is directed downward.

The wet cleaning devices 67, 68 of the downstream dust remover 51 are, for example, formed identically or similarly to the wet cleaning devices 23, 25 arranged in the material container 3.

The inner wall parts 17 and 61 are shown flat and horizontal in FIG. 1 for the sake of simplicity but are in reality preferably curved slightly upward toward the center, at least in parts, and furthermore generally slightly inclined, so that the planes defined by the edges of the inner wall parts make an angle of, for example, about 2° or possibly up to about 5° with horizontal planes, and the lowest points of the upper surfaces of the inner wall parts 17, 61 are located at the liquid outlet 48 or 78. The plate 111 forming the main component of the inner wall part 17, and the corresponding plate of the inner wall part 61, are accordingly likewise slightly curved, at least in part, and generally slightly inclined. The filter axes of the filters 19, 63 are preferably nevertheless all vertical and parallel to the container axes 4 and 54, respectively. The axes 171 and 201 of the wet cleaning devices 23 and 25, respectively, are perpendicular to that section of the plate 111 which carries the respective wet cleaning device. The radius of curvature of the plate 111 curved at least in parts is furthermore sufficiently large that each edge of a hole 111c, 111d which is located at the surface 111a also lies at least approximately in a plane and at least approximately defines a plane. Those flat surfaces of the spray members which face the crude gas space 29 in the rest positions of the spray members 185, 225 and are adjacent to said crude gas space are then at least approximately in the planes defined by the edges of the holes 111c, 111d. The surfaces adjacent to the clean gas space 30, 71 and located on the upper side of parts of the gas and wet cleaning devices are, for example, conically inclined downward and outward, at least in part, by a small amount, for example about 2°. Any cleaning liquid which may pass through the casings of the filters onto the last-mentioned surfaces and the upper surfaces of the inner wall parts 17, 61 during wet cleaning can then be rapidly discharged through the liquid outlets 48, 78.

The operation of the fluidized-bed apparatus 1 will now be described. At the start of operation, a batch of the particulate material 99 serving, for example, for the formation of a drug is first introduced into the fluidizing and crude gas space 29, for example through a closable material inlet which is not shown.

In the "normal" operation, described first below, of the apparatus for the treatment of the particulate material 99, the perforated bottom 13 is in the normal, horizontal operating position shown in FIG. 1. Furthermore, the spray members 37, 41, 185, 225 of the wet cleaning devices 23, 25, 35, 39 are in the rest positions outside the crude gas space 29. The wet cleaning devices 67, 68 of the downstream dust remover 51 are in analogous conditions. The material outlet 34 of the fluidized-bed container 33 and the outlet 74 of the downstream dust remover 53 are closed.

After the introduction of the particulate material 99 into the container 3, process gas is passed through the material and fluidized-bed container 3 and the downstream dust remover container 53 by means of the gas conduction members 81. Air serving as process gas is sucked from the environment into the air inlet 83 of the gas line by means of the suction device 92, filtered by means of the dust filter 86 and processed by means of the gas processing device 87. The air then flows through the gas inlet 33 into the gas distribution space 28 of the container 3 and through the perforated bottom 13 therein and upward through the fluidizing and crude gas space 29, said air fluidizing the particulate material 99. This then forms a fluidized bed and is treated. For example, during a part of the fluidization time, a liquid is first sprayed by means of the spray device 44 onto the particles of the material in order to agglomerate them to give larger particles and/or to provide them with coatings. Thereafter, the material 99 is further fluidized without spraying and is dried. The material can, however, also be merely dried without prior spraying.

The air forming the process gas and flowing from the fluidized bed upward into the filters 19 usually contains dust, for example abraded material from the particulate material and possibly also particles of solids which were dissolved or dispersed in the sprayed liquid. The air then flows through the casings of the filters 19 into the filter interiors.

During normal operation of the filters, the closure devices 21 are brought, by the air sucked by the suction device 93 through the container 3, into a state in which the air can flow from the filter interiors of the various filters 19 through passages in the closure devices 21 into the clean gas space 30 common to all filters 19 and from said clean gas space through the gas line 89 into the crude gas space 70 of the downstream dust remover 51. Thereafter, the air flows through the casings of the filters 63 into the filter interiors present therein, from these into the clean gas space 71 of the downstream dust remover and from this via the suction device 92 into the environment. The air is filtered while flowing through the casings of the filters 19, 63, the dust contained in it being separated off in the filtration members located on the outside of the casings.

The dust separated from the air by the filters 19 and 63 and adhering to the outer surfaces of the casings 121 of the filters reduces the permeability of the filters. The filters 19, 63 are therefore cleaned alternately with cleaning gas, individually or in groups, during the fluidization of the material 99. For cleaning of this type, the cleaning gas feed members 95 feed cleaning gas to the cleaning gas inlet 22, 66 of the or each filter to be cleaned. The feed members 95 may, for example, generate a sequence of cleaning gas pulses and deliver a cleaning gas pulse alternately to the various filters on a cyclic basis. The cleaning gas consists, for example, of air which was sucked out of the environment, filtered, and compressed by the compressor of the feed members 95, so that the pressure is greater than the ambient air pressure and than the pressure in the crude gas spaces 29 and 70, which is usually slightly below the ambient air pressure. If the cleaning gas feed members 95 feed compressed air serving as cleaning gas to a cleaning gas inlet 22 and/or 66 of a gas cleaning device 21 or 66, respectively, said air brings the closure device 21 or 65 of the relevant gas cleaning device into a state in which the closure device seals off the filter interior of the associated filter from the clean gas space 30 or 71. During the feeding of cleaning gas to a filter, no process gas, or at least virtually no process gas, therefore flows from the crude gas space into the relevant filter. The compressed air delivered as cleaning gas then flows through a passage in the closure device into the filter interior and through the gas-permeable casing of the relevant filter into the crude gas space 29 or 70. The compressed air serving as cleaning gas blows the dust adhering to the outside of the filter casing virtually completely away from the filter into the crude gas space. The filters 19 to which no compressed air serving as cleaning gas is delivered filter process gas during the cleaning of a filter.

During normal operation of the apparatus 1, the spray members 185 and 225 of the wet cleaning device 23 and 25 are—as already mentioned—located in the rest position which is shown in FIGS. 3 and 8 and in which those parts of the cleaning devices 23 and 25 which are adjacent to the crude gas space 29 are at least approximately flush with the surface 111a of the plate 111. The housings 173 and 203, the guide member 179 and the displaceable spray members 185, 225 of the wet cleaning devices 23 and 25, respectively, then together close the holes 111c and 111d in the plate 111 so that the wall part 17, together with the wet cleaning devices 23, 25, forms an essentially slightly concave and/or flat and essentially smooth surface which is adjacent to the crude gas space 29 and, apart from the cleaning liquid outlet holes 233, is free from holes. During normal operation of the fluidized-bed apparatus 1, the wet cleaning devices 23 and 25 therefore form no corners, recesses and grooves and other dead spaces which are present in or adjacent to the crude gas space 29 and in which dust and other contaminant materials may accumulate. The same applies to the wet cleaning devices 35 and 39. The windows 45, 46, 47, 77 are formed in such a way that they and those sections of the walls 5 and 55 which are connected to them likewise form virtually no corners, recesses or grooves and in particular no gaps or cracks in which dust or other contaminants may accumulate.

When the treatment of a batch of particulate material 99 is complete, the suction device 92 is switched off, the transport of process gas is terminated and the material 99 is removed from the fluidized-bed container 3. After the end of normal operation and after emptying of the material container 3, those inner surfaces of the wall 5 which are adjacent to the gas distribution space 28 and especially those which are adjacent to the fluidizing and crude gas space 29, and the filters 19, and the perforated bottom 13 and the inner surfaces of the windows 45, 46, 47 of the material container 3, can be subjected to wet cleaning or can be washed. Furthermore, those inner surfaces of the wall 55 and of the windows 77 and the filters 63 of the downstream dust remover 51 can also be subjected to wet cleaning. The cleaning liquid feed members 96 can deliver alternatively to different wet cleaning devices 23, 25, 35, 39, 67, 68 a cleaning liquid whose pressure is, for example, 200 kPa to 600 kPa and whose temperature is more than 0° C., for example 20° C. to 100° C. or possibly up to 150° C. During wet cleaning, the filters and walls are, for example, first prerinsed with cold water, then washed with hot water containing at least one detergent or other washing agent and finally again rinsed with demineralized water. For the wet cleaning of filters 19 and of the other parts present in the container 3, for example in each cleaning phase, cleaning liquid is sprayed first with the cleaning devices 33, then with the cleaning device 25 and finally with the cleaning devices 39, 35.

Figure 10:
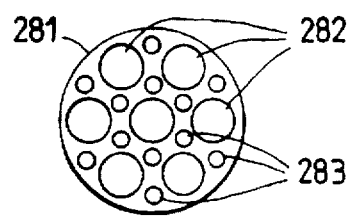
FIG. 10 shows a view of the lower side of an inner wall part of a container, said wall part carrying seven filters.

It is assumed that the spray member 185 of a first wet cleaning device 23 is in the rest position shown in FIG. 3 and the cleaning liquid feed members 96 deliver a cleaning liquid to the liquid inlet 177a of this cleaning device 23. The cleaning liquid then flows into the cavity 193 of the housing 173 and displaces the piston 184, against the force generated by the spring 191, downward toward the crude gas space 29 into the position shown in FIG. 4, in which the piston is adjacent to the guide member 179. The piston 184 displaces the spray member 185 to its cleaning or spray position shown in FIG. 4. During this displacement, a part of the rod 186 and the spray head 187 emerge from the housing 173 and from the hole 111c of the plate 111 into the crude gas space 29. The spray devices 185 and the displacement distance of the spray member 185 are substantially smaller than the axial dimension of the filters 19. In the cleaning position, the spray head 187 is at the height of the upper end sections of the filters 19. The cleaning liquid indicated by arrows in FIG. 10 and delivered to the wet cleaning device 23 flows out of the cavity 193 through the passage 194 into the cavity 187f of the spray head 187 and is then sprayed out of the spray head 185 through the liquid outlet holes 189, 190, in various directions, into the free region of the crude gas space. The cleaning liquid sprayed through the outlet holes 190 generates shear forces. These generate a torque which acts on the spray head 187 relative to the axis 171 so that the spray head 187 rotates around the axis 171 and rod 186, and each outlet hole 189, 190 is moved along an orbit around the axis 171.

When the spray member 225 of the second wet cleaning device 25 is in the rest position shown in FIG. 8 and when a cleaning liquid under pressure is now delivered to the liquid inlet 215 of this wet cleaning device 25, said cleaning liquid flows into the cavity 237 and displaces the piston 224 against the force generated by the spring 235 into a position in which the piston is adjacent to the guide member 219. The piston 224 displaces the spray member 225 to the cleaning or spray position shown in FIG. 9, a part of the spray member 225 and in particular the spray head 229 being displaced out of the housing 203 and out of the hole 111d of the plate 111 into the crude gas space 29. The spray head 229 is then at the height of the filters 19, close to the upper ends thereof.

The cleaning liquid delivered to the second wet cleaning device 25 flows out of the cavity 237 through the passage 238 into the cavity 230c of the spray head 229 and is then sprayed through the liquid outlet holes 232, 233, 234 in the crude gas space 29. The liquid flowing out of the outlet holes 234 generates shear forces which rotate the spray head 229.

If at least one wet cleaning device 23 or 25 sprays cleaning liquid, the latter strikes a part of the casings of filters 19 which are present close to the relevant cleaning device 23 or 25. During spraying of a filter, cleaning liquid also enters the hollow filter interior. If the filters are sprayed from the outside with a cleaning liquid, cleaning pulses are delivered alternately on a cyclic basis to the filters via the gas cleaning devices, so that the filters are blown out intermittently during the wet cleaning. The cleaning liquid entering the filter interiors during spraying is then blown out of the filters by the cleaning gas and/or then flows out of the filter again at the lower end of the casing, through the latter, under gravitational force. The or each wet cleaning device 23, 25 instantaneously used for spraying filters also sprays cleaning liquid upward against the wall part 17 and— depending on the position of the relevant cleaning device— also against the wall parts 8, 9 and perhaps even against the conical wall part 7 and the perforated bottom 13.

When the feed of cleaning liquid to a wet cleaning device 23 or 25 is ended, the spring 191 or 235 displaces the spray member 185 or 225, respectively, back to the rest position. When the spraying of the filters has ended, the filters are blown out intermittently or continuously with cleaning gas for a certain period.

When the cleaning liquid feed members 96 deliver a cleaning liquid to a wet cleaning device 35 and 39, the spray members 37 and 41 are displaced into the container interior 27 and spray this cleaning liquid against the perforated bottom 13 and against the inner surface sections of the wall 5, for example of the wall parts 6, 7, 8, which sections are close to the perforated bottom. During spraying of cleaning liquid by means of the devices 23, 25, 35, 39, the latter also spray the spray member 44 and the inner surfaces of the windows 45, 46, 47. In addition, the cleaning liquid striking a filter or a wall part during spraying then of course flows downward in the container so that the entire surfaces of the filters, which surfaces are adjacent to the crude gas space 29, and also the entire surfaces of the wall 5 which are adjacent to the fluidizing and crude gas space 29 and to the gas distribution space 28 can be cleaned by means of the cleaning devices 23, 25, 35, 39. The liquid sprayed during cleaning of the filters 19 and of the perforated bottom 13 can, for example, be discharged from the container 3 through the material outlet 34 or an additional outlet. During spraying of the filters 19, it may also be possible for a small amount of cleaning liquid to enter the clean gas space 30 through the casings of the filters. This liquid can be discharged from the clean gas space by temporarily opening the liquid outlet 48. After the wet cleaning, warm, dry air or another gas is passed through the containers and the filters by means of the gas conduction members 81, analogously to the process gas during normal operation, for drying the filters and other parts sprayed beforehand with cleaning liquid.

The filters 63 of the downstream dust remover 51 and the inner surfaces of the wall 55 which are adjacent to the crude gas space 70 of the latter, and of the windows 77 of the downstream dust remover container 53, can be cleaned by means of the wet cleaning devices of the downstream dust remover in the same way as the filters in the fluidized-bed container and the inner surfaces of its wall.

Since the casings 121 of the filters 19 and 63 have cylindrical outer surfaces cylindrical in cross-section and without waves or folds and are formed in such a way that, during normal operation of the fluidized-bed apparatus, the dust is deposited on the outer surfaces of the casings of the filters, the filters can be thoroughly cleaned everywhere during cleaning by means of a cleaning liquid. During the wet cleaning, the filters can therefore usually be completely freed from dust and any other contaminant materials adhering to them. Furthermore, during the use of the filters for filtering the process gas and removing dust from it and during cleaning of the filters, it is never possible for a connection bypassing the filters 19, 63 to form between the crude gas space 29 or 70 and the clean gas space 30 or 71. During wet cleaning, there is therefore also virtually no possibility of mutual contamination of the crude gas and clean gas spaces. Accordingly, it is also not possible for any solid substances originating from the fluidizing and crude gas space 29 to be transported by the process gas into the environment.

Since, during normal operation of the fluidized-bed apparatus, the wet cleaning devices 23, 25, 67 are flush with that surface of the container or wall part 17 or 61 which is adjacent to the crude gas space 29 or 70, the closer environment of the filters can also be kept thoroughly clean. Any contaminants entering, during normal operation, the two liquid outlet holes 33 passing through the small plate 231 and associated with the second wet cleaning devices 25 and 68 present in the containers 3 and 53, respectively, are washed out of the outlet holes 233 during spraying of a cleaning liquid through said holes.

The perforated bottom 13 and the filters 19 and 63 can be cleaned, inside the container containing them, so well that there is usually no need to remove the perforated bottom and the filters and clean them outside the containers, even in the case of a change of the treated particulate material and of the product produced. This makes it possible to clean the perforated bottom, the filters and also those surfaces of the walls of the containers which are adjacent to the crude gas spaces completely automatically, i.e. without the participation of people. The impairment of the purity and quality of the products produced as a result of human influences—such as, for example, insufficient care on the part of a person while carrying out cleaning work—can therefore be avoided. In addition, costs can be cut by automation of cleaning.

The number of filters and the number of wet cleaning devices used for cleaning the filters may be smaller or larger than in the arrangement shown in FIG. 2. However, a material container preferably contains at least two filters. on the other hand, a downstream dust remover container could contain only one filter. The number and arrangement of the wet cleaning devices used for cleaning the filters may vary depending on the number and arrangement of the filters, preferably at least two and particularly preferably at least three wet cleaning devices distributed around the filter being present for each filter. The inner container part or wall part 281 shown in FIG. 10 holds, for example, seven filters 282, of which one has an axis coinciding with the container axis and the others are distributed around the container axis. An outer and an inner ring, each having six identical wet cleaning devices 283, are also present.

Figure 11:
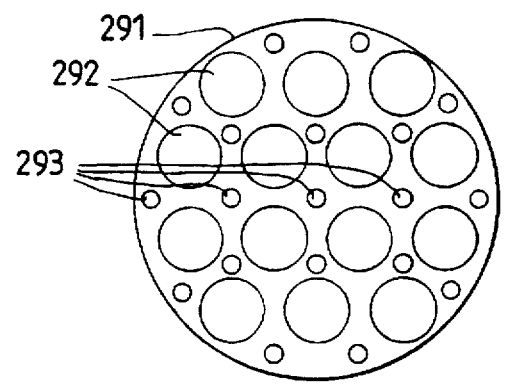
FIG. 11 shows a view of the lower side of a wall part having fourteen filters.

FIG. 11 shows an inner container part or wall part 291 on which 14 filters 292 and 19 identical wet cleaning devices 293 are fastened.

The container or wall parts 281 and 291 may form, for example, a partition of a material container or of a downstream dust remover container. The wet cleaning devices 283 and wet cleaning devices 293 can be formed, for example, similarly to the first wet cleaning devices 23 or similarly to the second wet cleaning device 25.

The apparatus and its operation may also be modified in other respects. For example, the reinforcing rings 202 may be omitted in the inner container or wall parts 17 and 251 if the plate 111 is sufficiently thick. Furthermore, it might be possible to arrange only a single filter in the container.

Moreover, the filter or filters, the gas cleaning device coordinated with the or each filter and the wet cleaning devices could be fastened on a wall part belonging to the outer wall of the container, for example on the top wall part of the container, instead of being fastened on an inner wall part present in the container.

Furthermore, instead of air, another gas—for example nitrogen—could be used as process gas and/or as cleaning gas.

For further details of the apparatus—in particular the formation of the filters and of the gas cleaning devices, the formation and sealing of the perforated bottom and the formation of the windows—reference may be made to patent applications simultaneously filed and assigned Ser. Nos. 08/773,329, 08/772,327 and 08/772,725

What is claimed is:

1. An apparatus for removing dust from a gas, having at least one container enclosing a crude gas space, a wall part adjacent to the crude gas space holding at least one filter projecting into the crude gas space and at least one spray member in order to spray a liquid against an outer surface of said at least one filter, wherein the wall part has, for said at least one spray member held by said wall part, a hole having a mouth opening into the crude gas space and wherein the spray member is displaceable from a rest position, in which it is present essentially on that side of the mouth of the hole which faces away from the crude gas space, into the crude gas space.

2. An apparatus as claimed in claim 1, wherein, in the rest position, said at least one spray member is at least approximately flush with that surface of the wall part which is adjacent to the crude gas space.

3. An apparatus as claimed in claim 1, wherein said at least one filter is nondisplaceably fastened to the wall part.

4. An apparatus as claimed in claim 1, wherein a housing for said at least one spray member is fastened to the wall part and wherein the housing projects away from the wall part on the side facing away from the crude gas space and seals the hole from a space adjacent to that side of the wall part which faces away from the crude gas space.

5. An apparatus as claimed in claim 4, wherein a piston is displaceably guided in the housing and is connected to the spray member, wherein a liquid inlet opens into the cavity present on that side of the piston which faces away from the crude gas space, wherein the piston has a passage connecting the cavity to at least one liquid outlet hole of the spray member and wherein at least one spring is present which exerts on the piston a force directed away from the crude gas space.

6. An apparatus as claimed in claim 1, wherein said at least one spray member has a spray head rotatable about an axis and having liquid outlet holes which makes different angles to the axis in axial projection and wherein at least one liquid outlet hole is arranged in such a way that, during spraying of liquid, the spray head is rotated by the shear force generated by said liquid.

7. An apparatus as claimed in claim 1, wherein the wall part has a surface adjacent to the crude gas space and divides the crude gas space from a clean gas space present above the stated wall part in the container, wherein a plurality of filters and spray members are held on the stated wall part and distributed in such a way that at least one spray member sprays a plurality of filters during spraying of the liquid, and wherein the container has a gas outlet connected to the clean gas space to enable gas entering the clean gas space from the crude gas space through various filters to be passed out of the clean gas space.

8. An apparatus as claimed in claim 1, wherein said at least one filter has a dimensionally stable, gas-permeable casing which is essentially rotationally symmetrical with respect to a filter axis and has a metallic filtration member with an outer surface adjacent to the crude gas space, in order to deposit dust contained in the gas on the outer surface during passage of gas from the crude gas space through the casing.

9. An apparatus for removing dust from gas passed through a particulate material, having at least one container enclosing a crude gas space, a wall part adjacent to the crude gas space holding at least one filter projecting into the crude gas space and at least one spray member in order to spray a liquid against an outer surface of said at least one filter, wherein the wall part has, for said at least one spray member held by said wall part, a hole having a mouth opening into the crude gas space and wherein the spray member is displaceable from a rest position, in which it is present essentially on that side of the mouth of the hole which faces away from the crude gas space, into the crude gas space.

10. An apparatus for removing dust from gas comprising a container divided by a wall to define a clean gas space and a crude gas space, said wall holding at least one filter that projects into the crude gas space and holding at least one spray member for spraying liquid onto an outer surface of said at least one filter, wherein said wall part includes a hole therethrough having a mouth opening into the crude gas space for each of said at least one spray member, wherein said at least one spray member is displaceable from a rest position within the hole and extending into the clean gas space, to a spraying position wherein at least a portion of said at least one spray member is within the crude gas space.

* * * * *